(12) United States Patent
Suzuki

(10) Patent No.: US 9,261,225 B2
(45) Date of Patent: Feb. 16, 2016

(54) ROTARY UNIT APPARATUS AND ROTATION SUPPORTING APPARATUS

(71) Applicant: KEM HONGKONG LIMITED, Kowloon (HK)

(72) Inventor: Naokazu Suzuki, Kanagawa (JP)

(73) Assignee: KEM HONGKONG LIMITED, Kowloon (HK)

( * ) Notice: Subject to any disclaimer, the term of this patent is extended or adjusted under 35 U.S.C. 154(b) by 0 days.

(21) Appl. No.: 14/276,419

(22) Filed: May 13, 2014

(65) Prior Publication Data

US 2014/0332643 A1  Nov. 13, 2014

(30) Foreign Application Priority Data

May 13, 2013  (JP) .................................. 2013-101707

(51) Int. Cl.
*F16M 11/08* (2006.01)
*F16M 11/18* (2006.01)

(52) U.S. Cl.
CPC ............... *F16M 11/18* (2013.01); *F16M 11/08* (2013.01)

(58) Field of Classification Search
CPC ............................... F16M 11/08; F16M 11/18
USPC ........................................................ 248/125.7
See application file for complete search history.

(56) References Cited

FOREIGN PATENT DOCUMENTS

JP  2006-227390 A  8/2006

*Primary Examiner* — Michael Safavi
(74) *Attorney, Agent, or Firm* — Griffin and Szipl PC

(57) ABSTRACT

To provide a rotary unit and a rotation support used for television, etc., with a simple structure, which can generate an adequate friction torque and has a strength enough to prevent an escape and fracture during its use, even if it is made of aluminum die-cast material or synthetic resin article, a lower interior cylindrical body and an upper interior cylindrical body are provided on an upper disc portion and a lower disc portion of a fixed cylindrical body and/or a rotary cylindrical body rotatably connected by a hinge shaft, and a reinforcing member is attached to the lower and the upper interior cylindrical bodies. The reinforcing member comprises an insertion hole in which the hinge shaft is inserted, wherein locking portions provided on a plurality of locking pieces (which are provided by folding the outer circumference portions) are locked by the lower and the upper interior cylindrical bodies.

14 Claims, 21 Drawing Sheets

ROTARY UNIT APPARATUS AND ROTATION SUPPORTING APPARATUS

This application claims priority from Japanese Patent Application No. 2013-101717, filed May 13, 2013, the entire disclosure of which is incorporated herein by reference.

FIELD OF THE INVENTION

The present invention relates to a rotary unit apparatus and a rotation supporting apparatus for supporting a flat-type television receiver, a flat-type display device or audio equipment, and so on, so as to make the latter rotatable in a horizontally right and left direction.

BACKGROUND ART

As a rotary unit apparatus, which supports a flat-type television receiver (which is referred to as television in the following) on a mounting stand, so as to make the latter rotatable in a horizontally right and left direction, the one described in JP Laid-Open Patent Application Publication No. 2006-227390 (which is referred to as Patent Document 1 in the following).

A rotary unit apparatus of television according to Patent Document 1 as described above comprises a pole attached to a monitor mounting stand for supporting the television; an upper bush mounted in contact with a lower surface of the pole; an attaching base mounted in contact with a lower surface of the upper bush; a lower bush mounted in contact with a lower surface of the attaching base; a spring plate mounted in contact with a lower surface of the lower bush; a back plate mounted in contact with a lower surface of the spring plate; and a fixing bolt for mounting the upper bush, the attaching base, the lower bush, the spring plate and the back plate are to the pole, so as to bring all the components together.

In a rotary unit apparatus as described in Patent Document 1 as described above, a lower bush is merely in contact with a lower side of a top plate of an attaching base, as shown in particular in FIGS. 9 and 13. Therefore, in case that a television receives a pressure downward or upward from either right or left end portion, it is possible that the top plate escapes from the lower bush, or that the top plate is broken.

SUMMARY OF THE INVENTION

The present invention is made to solve the above-mentioned problems, and an object of the invention is to provide a rotary unit apparatus and a rotation supporting apparatus used for television, etc., with a simple structure, which can generate an adequate friction torque and has a strength enough to prevent an escape and fracture during its use, even if it is made of aluminum die-cast material or synthetic resin article.

To achieve the above-mentioned object, the present invention according to the first aspect comprises a fixed cylindrical body attached to a base member, wherein the fixed cylindrical body comprises: an upper disc portion; a lower interior cylindrical body surrounding an insertion hole provided on the upper disc portion, wherein the lower interior cylindrical body is provided to hang down perpendicular to the upper disc portion; a lower exterior cylindrical body provided on an outer circumference of the lower interior cylindrical body spaced apart at a predetermined interval from the lower exterior cylindrical body, the lower interior cylindrical body being provided to hang down perpendicular to the upper disc portion; and a plurality of outer ribs connecting the lower interior cylindrical body and the lower exterior cylindrical body. The present invention according to the first aspect further comprises a rotary cylindrical body attached to a supporting member, wherein the rotary cylindrical body comprises: a lower disc portion; an upper interior cylindrical body erected upward from the lower disc portion; an upper exterior cylindrical body provided on an outer circumference of the upper interior cylindrical body spaced apart at a predetermined interval from the upper interior cylindrical body and erected upward from the lower disc portion; a plurality of outer ribs connecting the upper interior cylindrical body and the upper exterior cylindrical body; and a lower cylindrical body provided so as to hang down perpendicular to the lower disc portion and to pass through the insertion hole provided on the upper disc portion, so that the lower cylindrical body protrudes to the inside of the lower interior cylindrical body. The present invention according to the first aspect further comprises a hinge shaft passing through the lower cylindrical body, wherein the hinge shaft connects the rotary cylindrical body and the fixed cylindrical body in a relatively rotatable manner; and a friction mechanism mounted on the hinge shaft so as to generate a friction torque between the fixed cylindrical body and the rotary cylindrical body, during rotation of the rotary cylindrical body. The present invention according to the first aspect is thus characterized in that a reinforcing member is provided in a direct and/or indirect contact with the upper disc portion inside the lower interior cylindrical body of the fixed cylindrical body and/or the lower disc portion inside the lower interior cylindrical body of the rotary cylindrical body, and locking pieces provided on the reinforcing member are locked by the lower interior cylindrical body and/or the upper interior cylindrical body.

The invention according to the second aspect is characterized in that a hinge shaft comprises a male screw portion and a nut portion, and a male screw portion is screwed into a female screw hole provided on the lower cylindrical body of the rotary cylindrical body.

The invention according to the third aspect is characterized in that a friction mechanism comprises a first friction washer, wherein a hinge shaft is inserted into an insertion hole of the first friction washer and the first friction washer is locked by a upper disc portion of a fixed cylindrical body; a second friction washer in contact with the first friction washer, wherein the hinge shaft is inserted into an insertion hole of the second friction washer and the second friction washer is locked by said upper disc portion of said fixed cylindrical body; a third friction washer in direct or indirect contact with a lower surface side of the upper disc portion, wherein the third friction washer is fixed to the lower cylindrical body; and elastic means in contact with said third friction washer, wherein the elastic means are mounted on the hinge shaft.

The invention according to the fourth aspect is characterized in that a spacer washer is provided between an upper disc portion of a fixed cylindrical body and a lower disc portion of a rotary cylindrical body, wherein the spacer washer comprises an insertion hole and it is fixed to the upper disc portion, by housing the first friction washer and the second friction washer into the insertion hole of the spacer washer.

The invention according to the fifth aspect is characterized in that a reinforcing member comprises a plurality of locking pieces provided by folding edges of the reinforcing member, and locking portions of the locking pieces are locked by locking ribs provided on an inner wall of a lower interior cylindrical body and/or an interior cylindrical body, so as to structure the reinforcing member.

The invention according to the sixth aspect is characterized in that a reinforcing member comprises a plurality of locking pieces provided by folding edges of the reinforcing member, and locking portions of the locking pieces are locked by an open end side of a lower interior cylindrical body and/or an upper interior cylindrical body so as to structure the reinforcing member.

The invention according to the seventh aspect is characterized in that a reinforcing member comprises a plurality of locking pieces provided by folding edges of the reinforcing member, and locking portions of said locking pieces are locked by an open end side of a lower interior cylindrical body and/or an upper interior cylindrical body, and/or said outer ribs so as to structure the reinforcing member.

The invention according to the eighth aspect is characterized in that a reinforcing member comprises a plurality of locking pieces provided by folding edges of the reinforcing member, and locking portions of the locking pieces are locked by locking ribs provided on an inner wall of a lower interior cylindrical body and/or an upper interior cylindrical body, and/or said open end side of the lower interior cylindrical body and/or the upper interior cylindrical body so as to structure the reinforcing member.

The invention according to the ninth aspect is characterized in that the rotary unit apparatus according to either one of first to eighth aspects is used.

The invention is structured as described above, so that it serves as a rotary unit apparatus and a rotation supporting apparatus used for a heavy television, and it can generate a required friction torque with a structure as simple as possible, even in use of synthetic resin for a constituting element. Still further, a reinforcing member assures that adequate durability is sustained for the apparatus according to the invention.

EMBODIMENTS

In the following, reference is made to best modes of a rotary unit apparatus according to the present invention, based on the drawings. In the following reference is made to one of its uses, i.e. for a flat-type television being an example of a flat-type display apparatus, but the rotary unit apparatus according to the present invention is also applicable to a flat-type monitor television, a tablet-type display apparatus, audio equipment, etc. Accordingly, each reference to "television, etc." in this description and claims also implies a flat-type monitor television, tablet-type display apparatus, audio equipment, etc. as listed above, in addition to a flat-type television.

Figure 1:
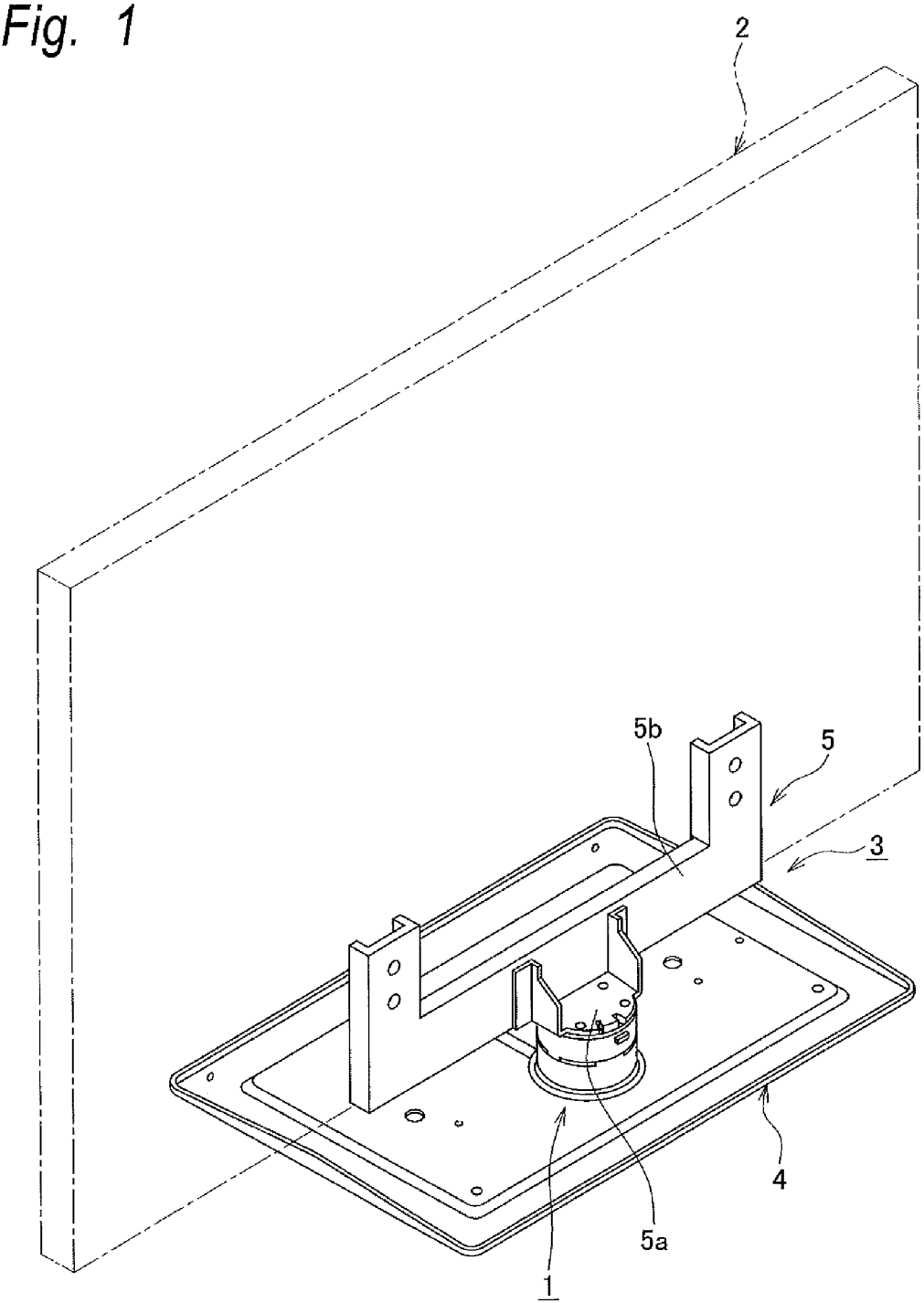
FIG. 1 is a perspective view of a rotary unit apparatus according to the present invention, which is available for use.
Figure 2:
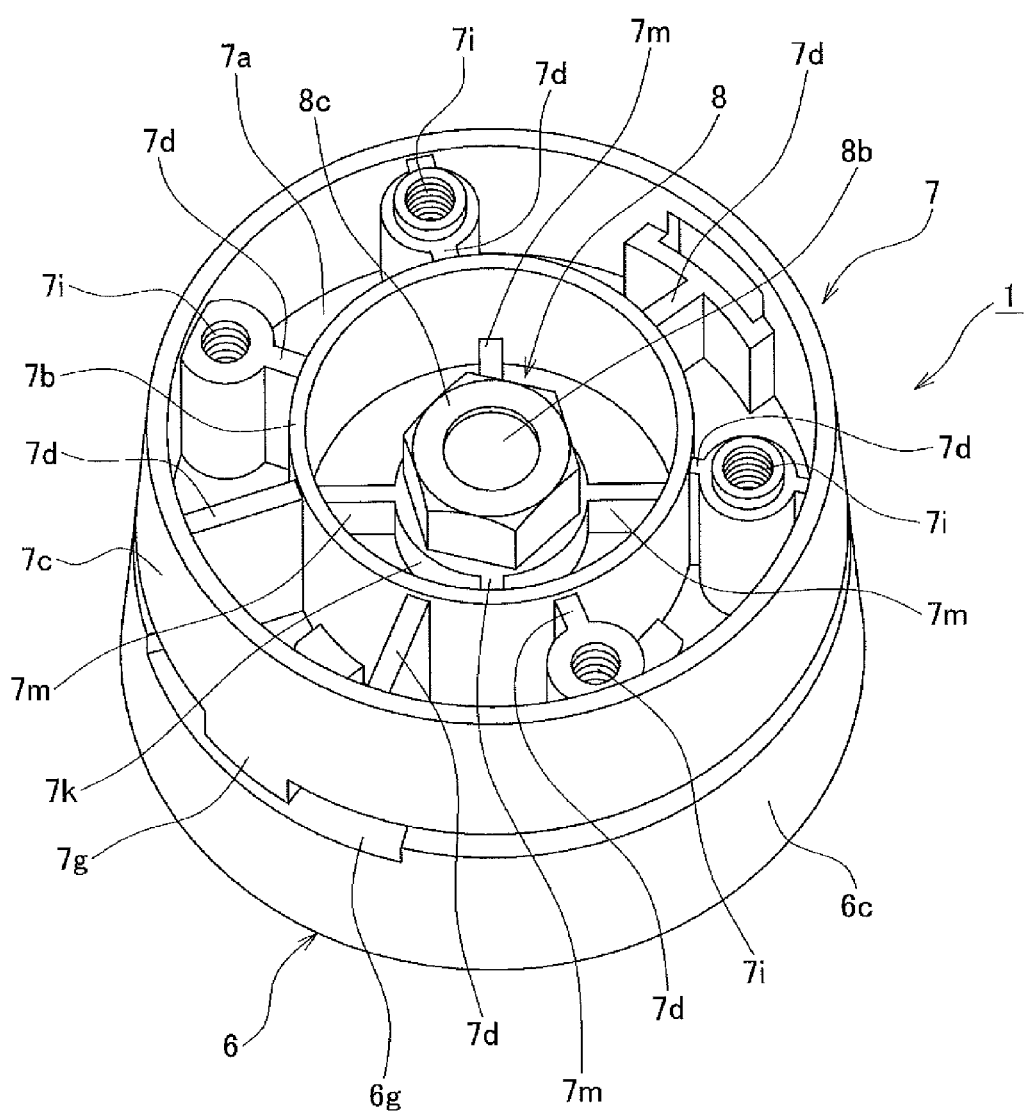
FIG. 2 is a perspective view of a rotary unit apparatus according to the present invention.
Figure 3:
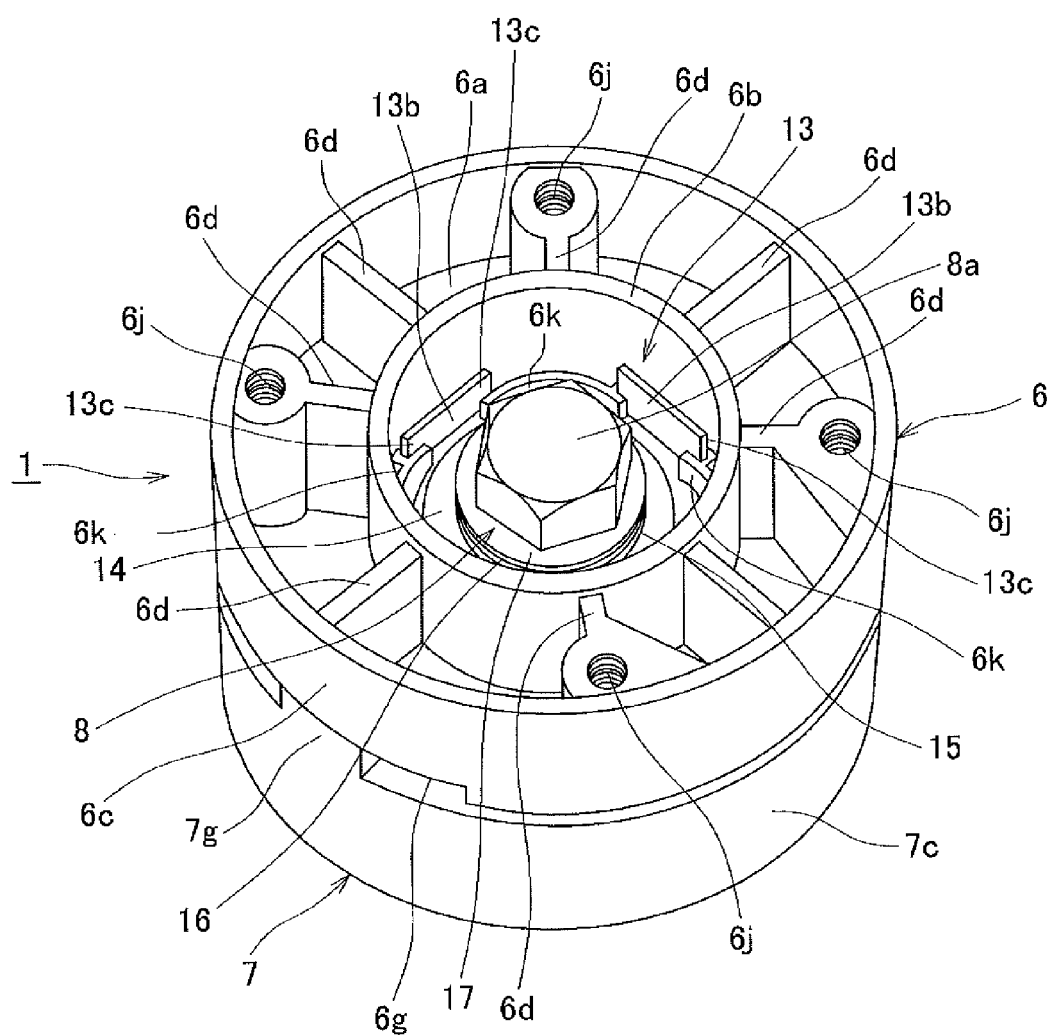
FIG. 3 is a perspective view of a rotary unit apparatus according to the present invention, as seen from below.

FIG. 1 is a perspective view illustrating an example of use of a rotary unit apparatus according to the present invention. According to FIG. 1, a rotary unit apparatus 1 according to the present invention is used between a base member 4 and a bracket 5 of a rotation supporting apparatus 3 of a flat-type liquid crystal television 2.

Embodiment 1

FIGS. 1 to 9 show Embodiment 1 of a rotary unit apparatus 1 according to the present invention. According to the drawings, the rotary unit apparatus 1 according to Embodiment 1 comprises a fixed cylindrical body 6 fixed to a base member 4; a rotary cylindrical body 7 fixed to a bracket 5 side, wherein the bracket 5 is rotatably attached to the fixed cylindrical body 6 via a hinge shaft; a friction mechanism 9 mounted to the hinge shaft 8 so as to generate friction torque between the fixed cylindrical body 6 and the rotary cylindrical body 7; and a reinforcing member 13 for preventing the fixed cylindrical body 6 and/or the rotary cylindrical body 7 from escaping and breaking.

A base member 4 has the shape of plate in a plane rectangular shape. Its shape and structure are not particularly limited, as long as a fixed cylindrical body 6 can be attached to the base member. The base member 4 is put on a mounting stand (not shown) of a television, etc. A bracket 5 comprises an attaching plate 5a attached to an upper portion of a rotary cylindrical body 7 and a supporting member 5b attached to the attaching plate 5a, wherein a television 2 is attached to the supporting member 5b. In the meantime, a shape and a structure of the bracket 5 are not limited to the ones of the embodiments. Brackets of various shapes and structures are conceivable.

A fixed cylindrical body 6 is made of aluminum die-cast or synthetic resin, and has a cylindrical shape. The fixed cylindrical body 6 comprises a lower interior cylindrical body 6b integrally formed with an upper disc portion 6a covering the top so as to hang down from the upper disc portion; a lower exterior cylindrical body 6c provided on the outside of the lower interior cylindrical body 6b, so as to likewise integrally hang down from the upper disc portion 6a concentrically with the lower interior cylindrical body 6b; and a plurality of outer ribs 6d, 6d . . . radially connecting the lower exterior cylindrical body 6c and the lower interior cylindrical body 6b. Following constituting elements are provided on the upper disc portion 6a: an insertion hole 6e provided concentrically with the lower interior cylindrical body 6b; a ring-shaped convex portion 6f provided on an upper surface circumference of the insertion hole 6e; arcuate groove portions 6g, 6g provided in opposed positions near an outer circumference of the upper disc portion 6a; four projecting portions 6h, 6h . . . provided at 90° intervals near the outer circumference of the upper disc portion 6a; and four locking hole portions 6i, 6i . . . provided at 90° intervals inside from the projecting portions 6h, 6h . . . . Moreover, some of the outer ribs 6d, 6d . . . , which are so selected that they are situated at 90° intervals, respectively have swollen portions, on each of which a female hole 6j is provided. On the other hand, locking ribs 6k, 6k . . . disposed at 90° intervals are provided to protrude from the inner wall of the lower interior cylindrical body 6b on the upper disc portion 6a side, wherein the locking ribs extend in circumferential direction.

A rotary cylindrical body 7 as well is made of aluminum die-cast or synthetic resin, and has a cylindrical shape. Its contour is substantially the same as that of a fixed cylindrical body 6. A lower disc portion 7a is provided on a lower end side in the area facing an upper disc portion 6a of the fixed cylindrical body 6. The rotary cylindrical body 7 further comprises an upper interior cylindrical body 7b formed integrally with the lower disc portion 7a so as to extend upward from the lower disc portion; an upper exterior cylindrical body 7c provided on the outside of the lower interior cylindrical body 7b, so as to likewise integrally extend upward from the lower disc portion 7a concentrically with the upper interior cylindrical body 7b; and a plurality of outer ribs 7d, 7d . . . radially connecting the upper exterior cylindrical body 7c and the upper interior cylindrical body 7b. Following constituting elements are provided on the upper disc portion 7a: a female screw hole 7e provided concentrically with the upper interior cylindrical body 7b; a lower cylindrical body 7f provided so as to further extend the female screw hole 7e downward; arcuate convex portions 7g, 7g provided in opposed positions near an outer circumference of the female screw hole 7e; four locking holes 7h, 7h . . . provided at 90° intervals near the outer circumference of the female screw hole 7e. Moreover, some of the outer ribs 7d, 7d . . . , which are so selected that they are situated at 90° intervals, respectively have swollen portions, on each of which a female hole 7i is provided. On the other hand, engaging portions 7j, 7j . . . are provided on a lower tip of a lower cylindrical body 7f by scrapping off surface areas at 90° intervals in four directions. Still further, a boss portion 7k having a flat top surface is provided around the female screw hole 7e, and four inner ribs 7m, 7m . . . are radially provided between the boss portion 7k and the upper interior cylindrical body 7b.

Figure 4:
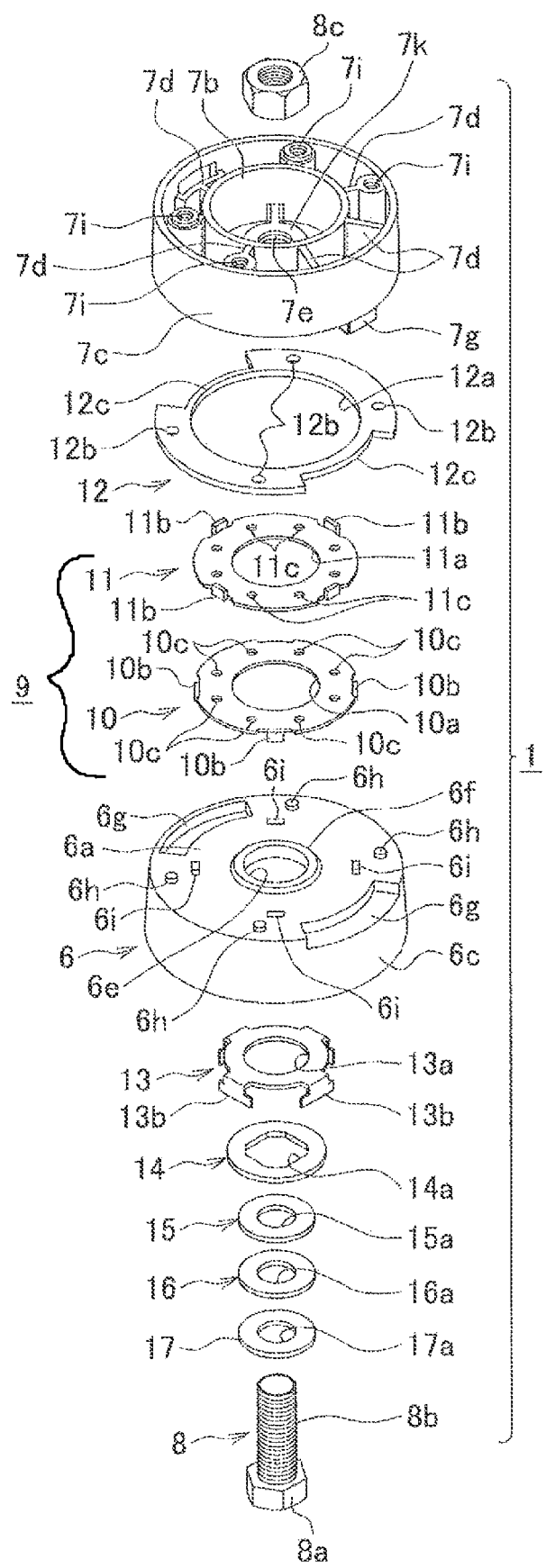
FIG. 4 is an exploded perspective view of a rotary unit apparatus according to the present invention.
Figure 5:
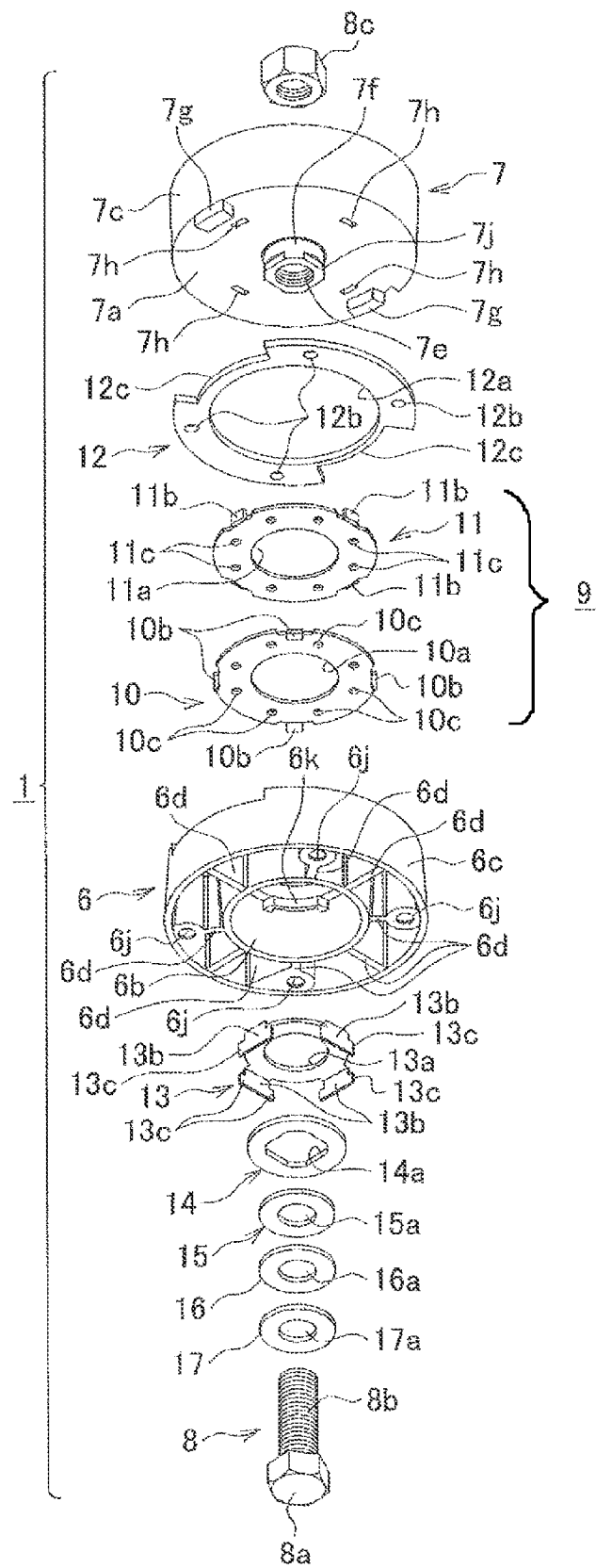
FIG. 5 is an exploded perspective view of a rotary unit apparatus according to the present invention, as seen from below.
Figure 6A:
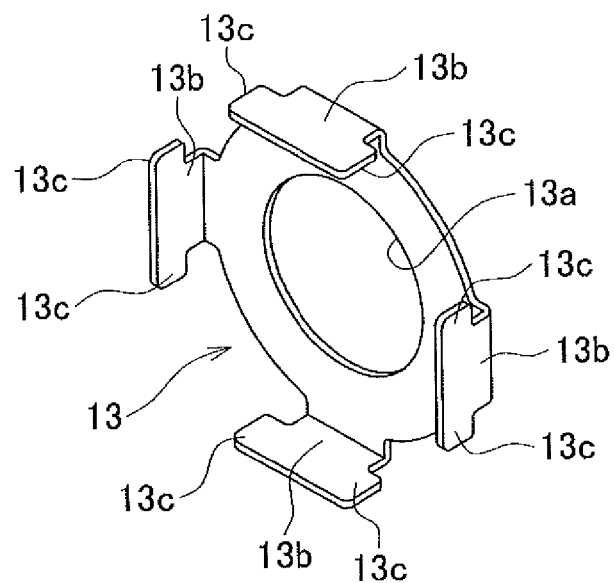
FIG. 6 show a first reinforcing member of a rotary unit apparatus according to the present invention, FIG. 6A being a perspective view thereof, and FIG. 6B a plan view.
Figure 6B:
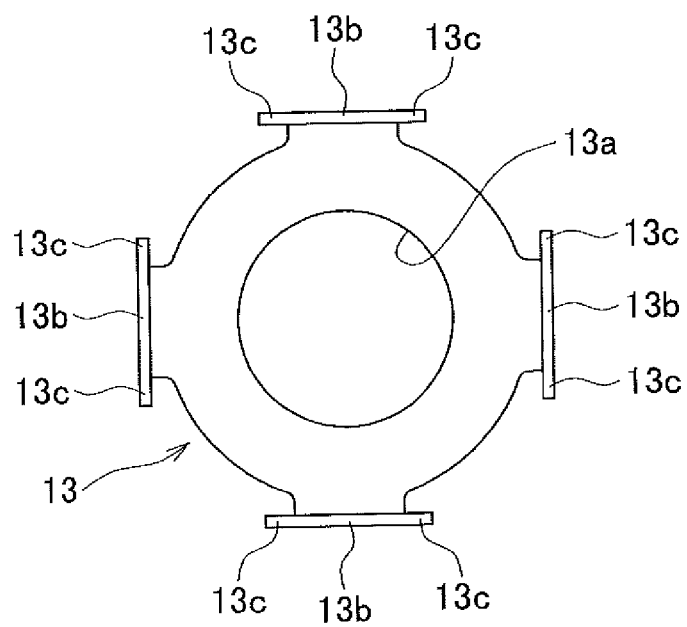
Figure 7:
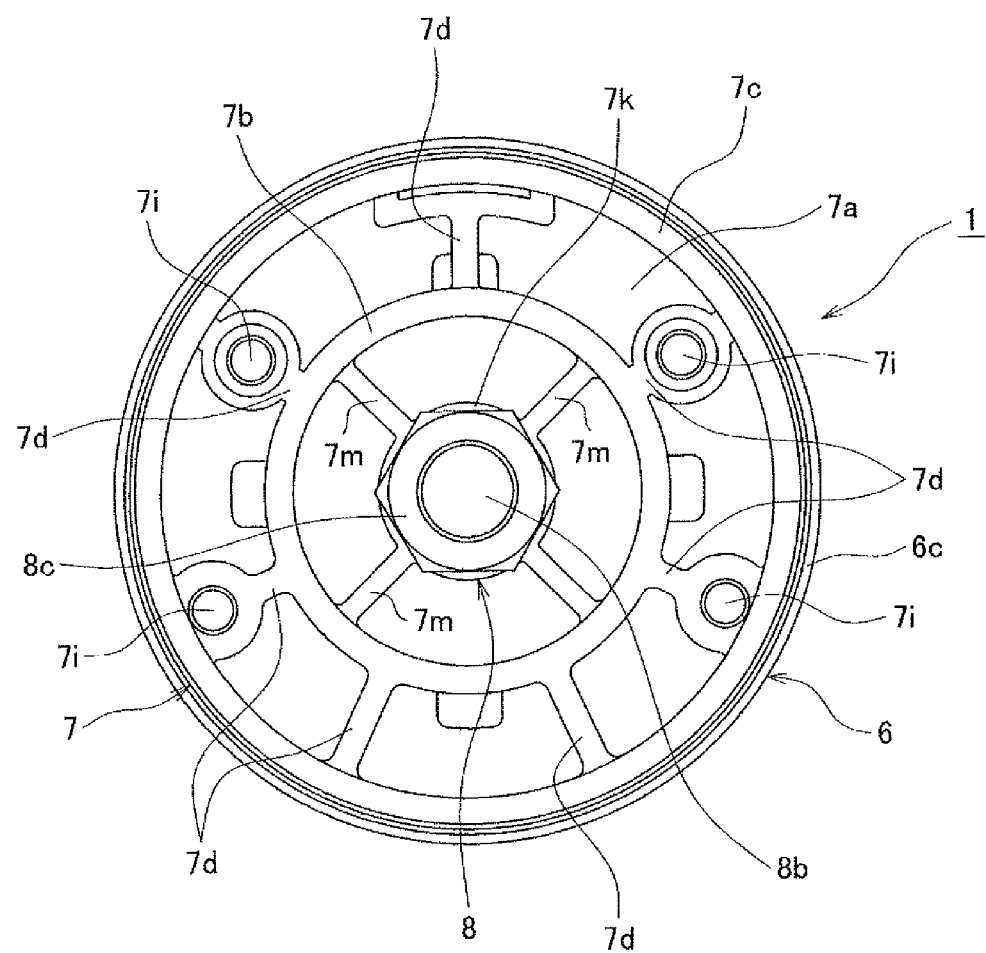
FIG. 7 is a plan view of a rotary unit apparatus according to the present invention.
Figure 8:
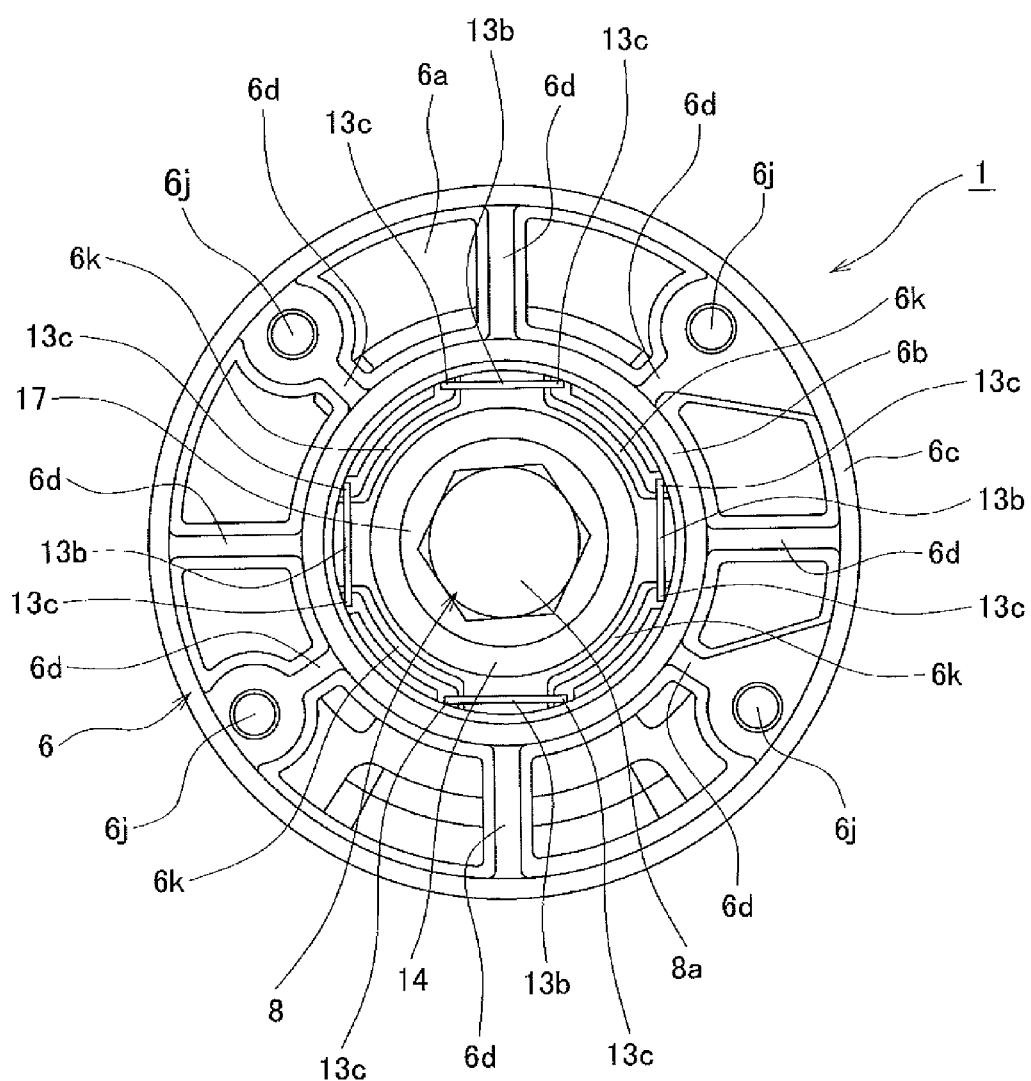
FIG. 8 is a bottom view of a rotary unit apparatus according to the present invention.
Figure 9:
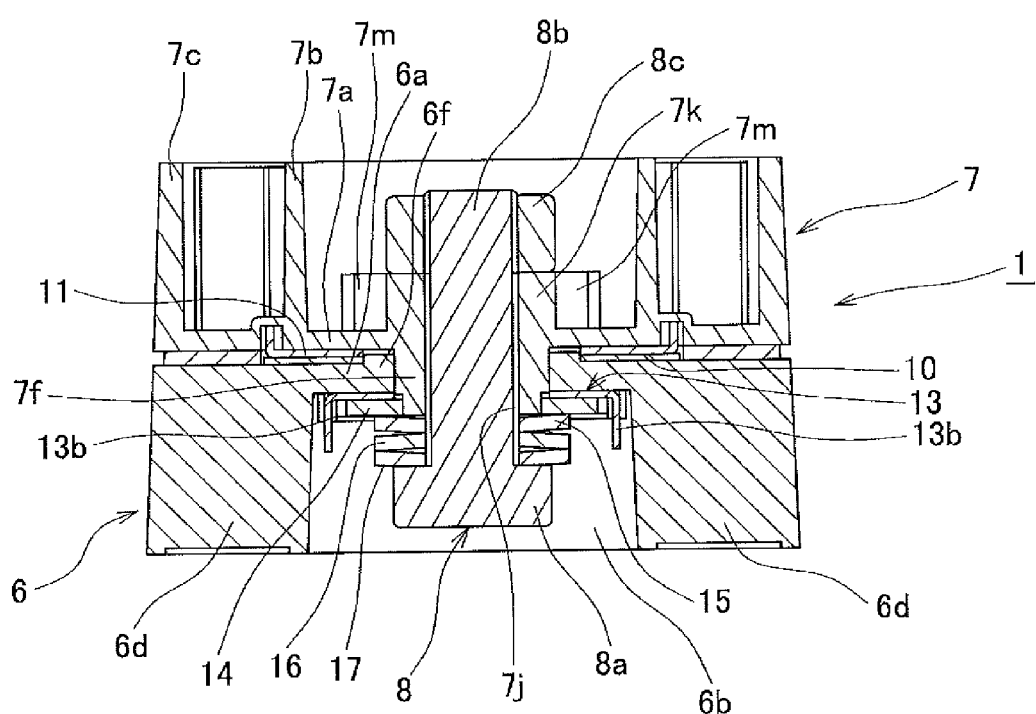
FIG. 9 is a longitudinal sectional view of a rotary unit apparatus according to the present invention.
Figure 10:
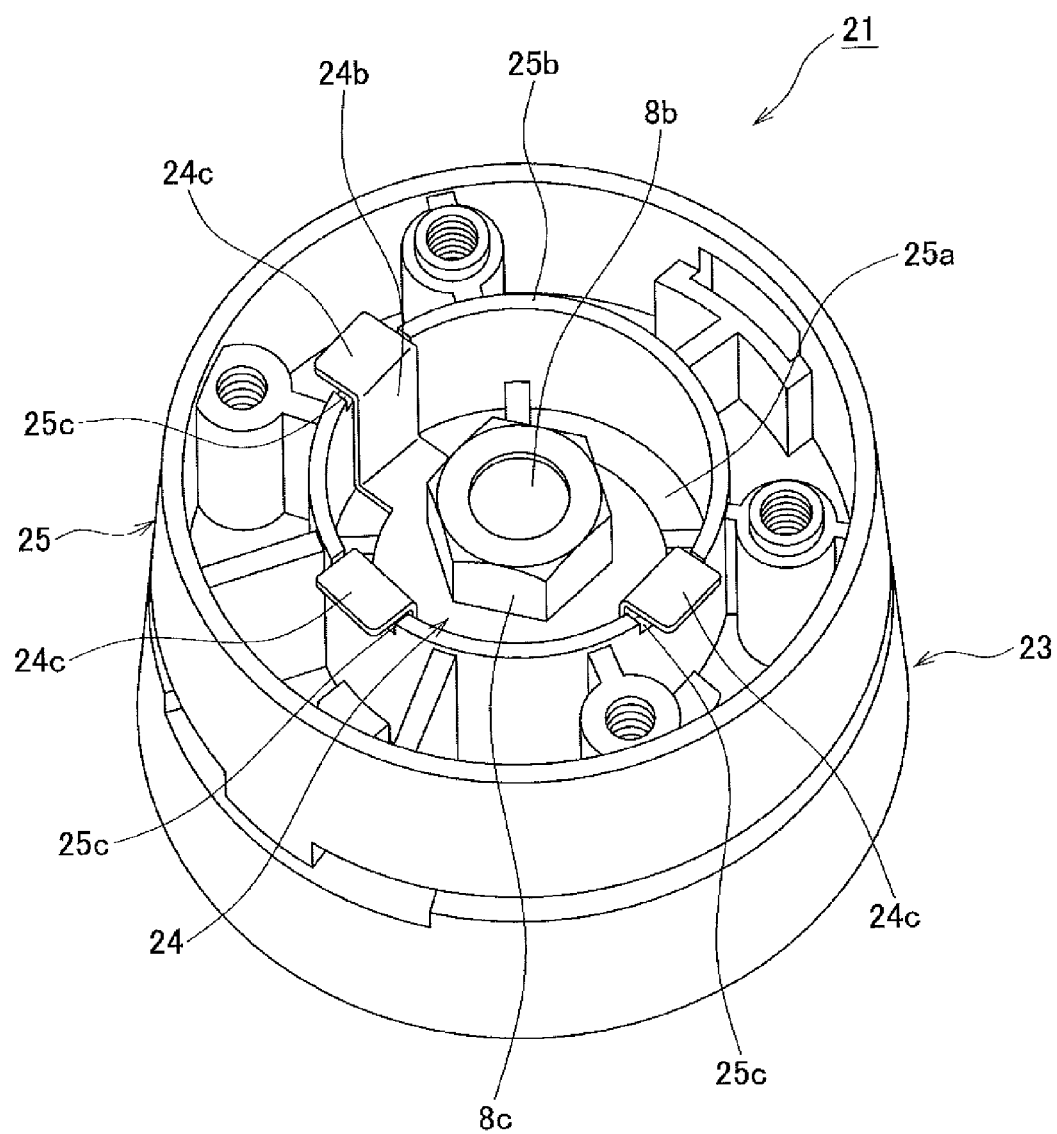
FIG. 10 is a perspective view showing another embodiment of a rotary unit apparatus according to the present invention.
Figure 11:
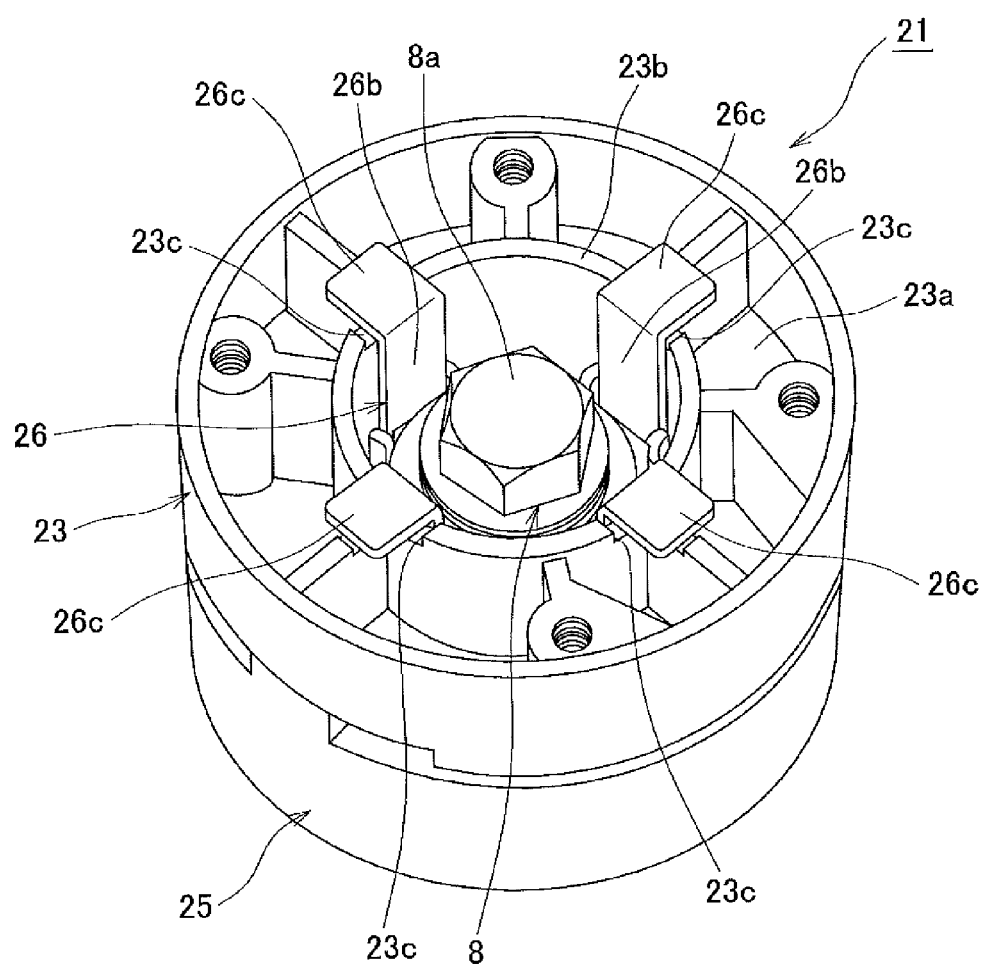
FIG. 11 is a perspective view of a rotary unit apparatus as shown in FIG. 10, wherein the perspective view is seen from below.
Figure 12:
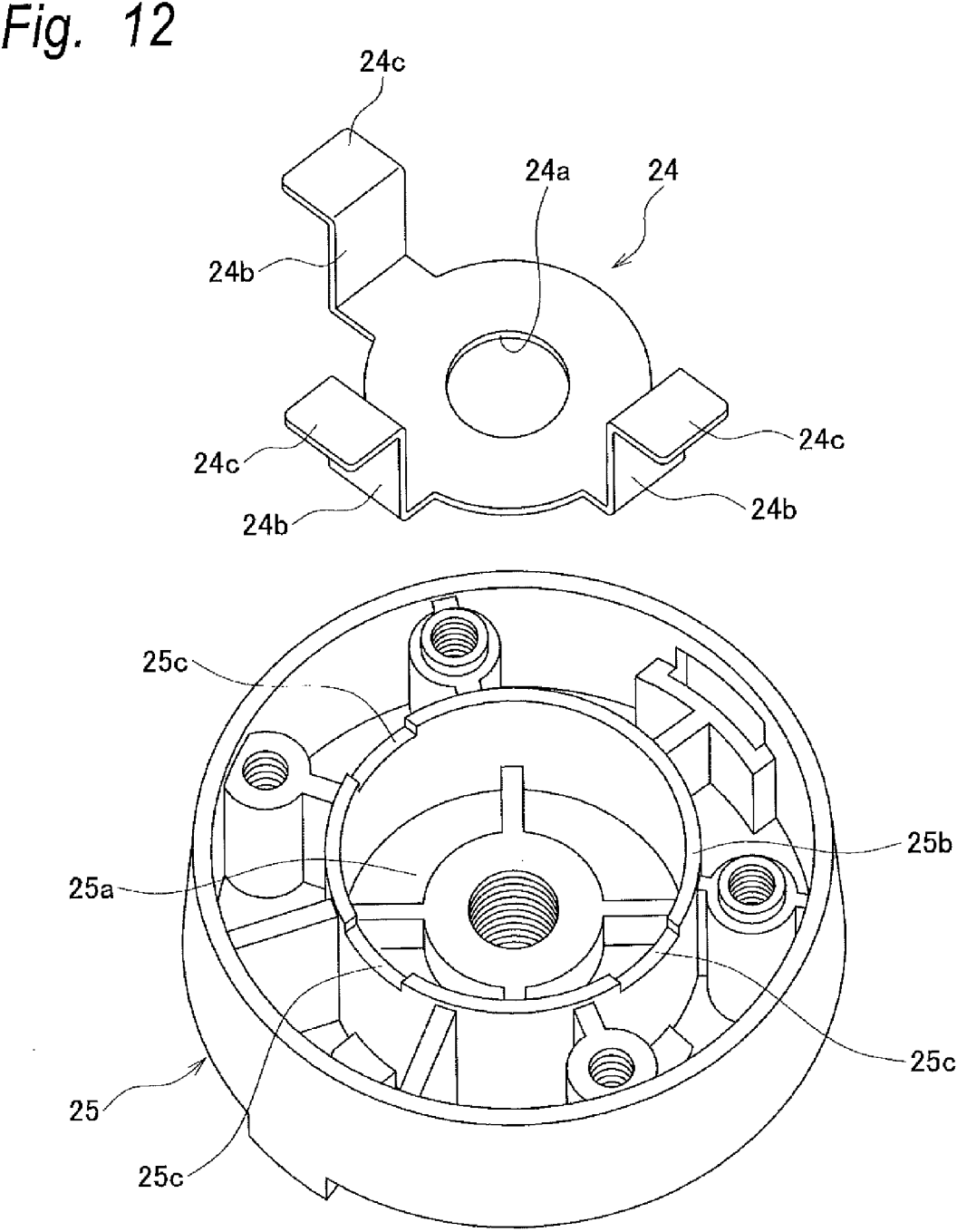
FIG. 12 is a perspective view of a second reinforcing member of a rotary unit apparatus as shown in FIG. 10.
Figure 13:
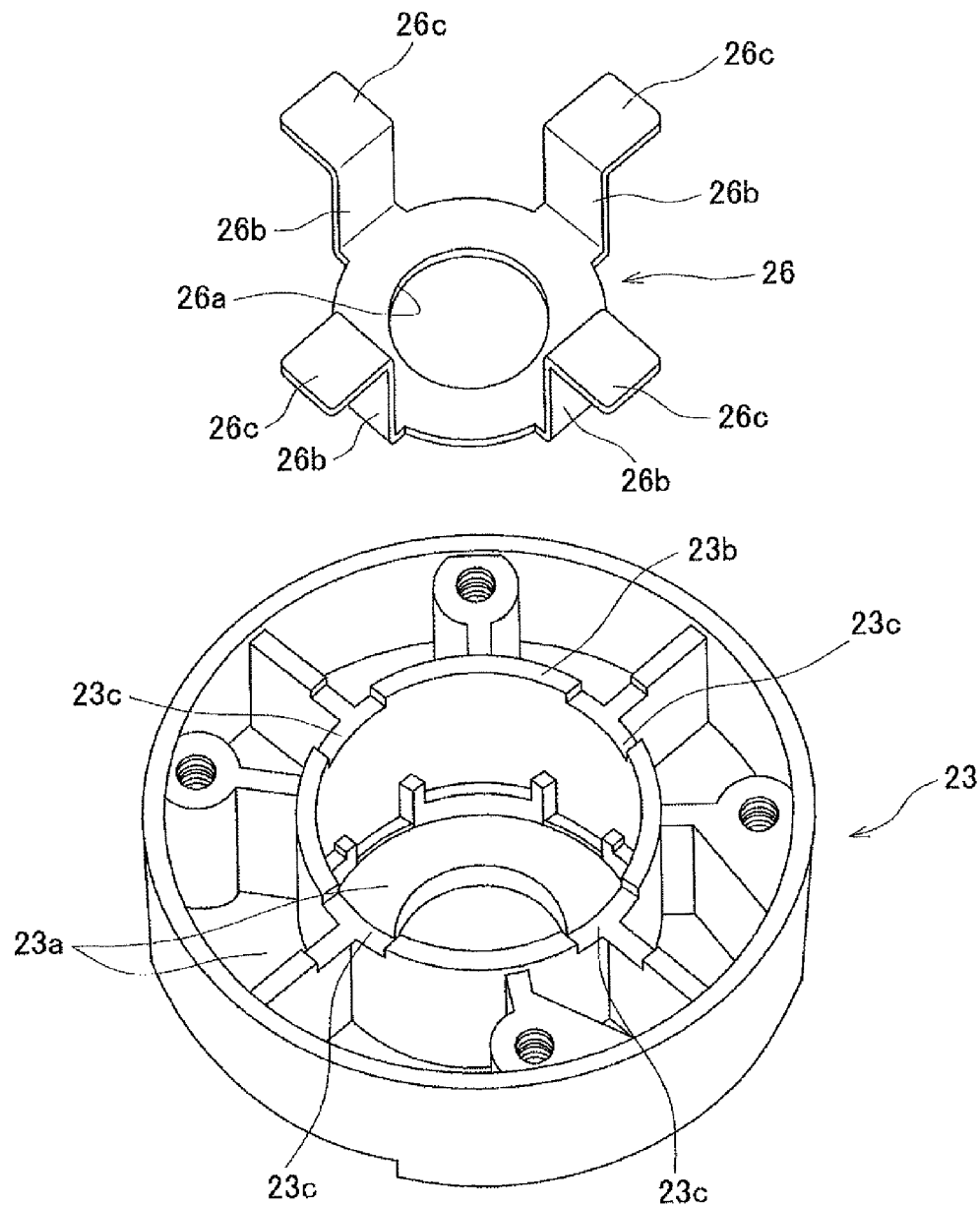
FIG. 13 is a perspective view of a third reinforcing member of a rotary unit apparatus as shown in FIG. 10.
Figure 14:
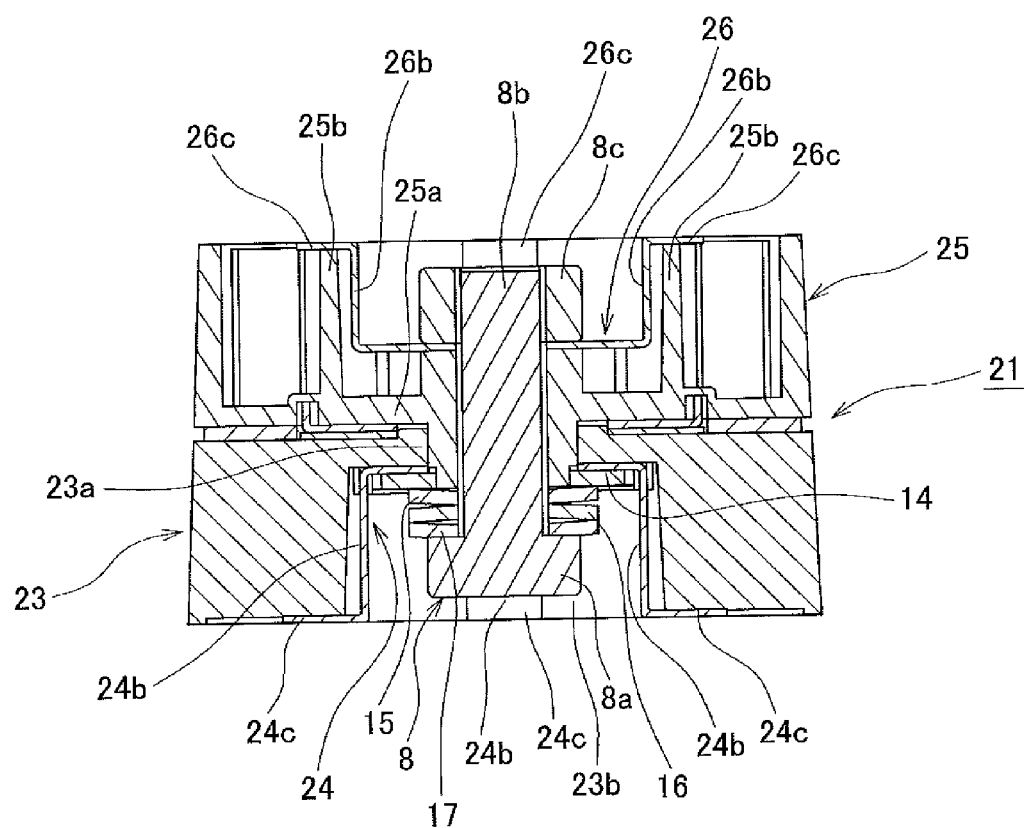
FIG. 14 is a longitudinal sectional view of a rotary unit apparatus as shown in FIG. 10.

A hinge shaft 8 is e.g. made of SUS, and in this embodiment, it comprises a male screw portion 8b having a head portion 8a and a nut portion 8c. As shown in FIGS. 4, 5 and 9, the male screw portion 8b is inserted from below into a female screw hole 7e and screwed therewith. In this manner, the hinge shaft 8 is structured such that it connects a fixed cylindrical body 6 and a rotary cylindrical body 7 in a relatively rotatable manner. In the meantime, the hinge shaft 8 does not necessarily involve a bolt, but an ordinary hinge shaft can be used for this purpose, wherein the hinge shaft used connects the fixed cylindrical body 6 and the rotary cylindrical body 7 using other known methods such as caulking at the ends of the shaft. In this case, the female screw hole 7e can be replaced by an ordinary insertion hole. Still further, instead of caulking, a male screw portion can be provided on a part on which a nut portion is attached. In case of an ordinary hinge shaft, a detent means can be provided between the hinge shaft and a lower cylindrical body 7f, as necessary. The hinge shaft 8 in claims and specification of this invention implies both of the above-mentioned embodiments. In case that the male screw portion 8b of the hinge shaft 8 is screwed with the female screw hole 7e provided on the lower cylindrical body 7f of the rotary cylindrical body 7, the hinge shaft 8 has a double nut effect together with a nut portion 8c, so as to prevent the nut portion 8c from loosening during use.

A friction mechanism 9 comprises, especially as shown in FIGS. 4, 5 and 9, a first friction washer 10 having an insertion hole 10a in an axial direction on a central portion of the first friction washer, wherein a male screw portion 8b of a hinge shaft 8 is inserted into the insertion hole, and wherein the first friction washer 10 is provided by inserting a ring-shaped convex portion 6f into the insertion hole 10a, while four locking pieces 10b, 10b . . . (which are formed by folding respective edges of the first friction washer 10 downward) are inserted into locking hole portions 6i, 6i . . . provided on an upper disc portion 6a of a fixed cylindrical body 6, so as to respectively engage the locking hole portions; a second friction washer 11 having an insertion hole 11a in an axial direction on a central portion of the second friction washer, wherein the second friction washer 11 is provided in a pressurized contact with the first friction washer 10, while four locking pieces 11b, 11b . . . (which are formed by folding respective edges of the friction washer 11 downward) are inserted into locking holes 7h, 7h . . . provided on a lower disc portion 7a of a rotary cylindrical body 7, so as to respectively engage the locking holes; a spacer washer 12 having a large-diameter insertion hole 12a in an axial direction on a central portion of the spacer washer, wherein the spacer washer is provided between the upper disc portion 6a of the fixed cylindrical body 6 and the lower disc portion 7a of the rotary cylindrical body 7 by housing the first friction washer 10 and the second friction washer 11 into the insertion hole 12a and by fitting projecting portions 6h, 6h . . . provided on the upper disc portion 6a of the fixed cylindrical body 6 into locking holes 12b, 12b . . . of the spacer washer; a reinforcing member 13 being in pressurized contact with a bottom surface of the upper disc portion 6a, while a lower cylindrical body 7f (which extends from the rotary cylindrical body 7 and passes through an insertion hole 6e provided on the upper disc portion 6a of the fixed cylindrical body 6 so as to protrude from the insertion hole 6e) is inserted into an insertion hole 13a provided in an axial direction on a central portion of the reinforcing member; a third friction washer 14 having a deformed insertion hole 14a, wherein the third friction washer 14 is provided in pressurized contact with the reinforcing member 13, while engaging portions 7j of the lower cylindrical body 7f engage with the deformed insertion hole 14a; and spring washers or dish springs 15, 16, 17 provided between a head portion 8a of the hinge shaft 8 and the third friction washer 14, while the male screw portion 8b of the hinge shaft 8 is inserted into respective insertion holes 15a, 16a, 17a. In this manner, the friction mechanism 9 is so structured that when a nut portion 8c of the hinge shaft 8 is fastened toward the male screw portion 8b, this leads to generation of friction torque between the first friction washer 10 and the second friction washer 11, as well as between the reinforcing member 13 and the third friction washer 14, in a rotation of the rotary cylindrical body 7 in a horizontal right and left direction. In the meantime, reference numerals 12c, 12c found on the spacer washer 12 denote notch portions for allowing arcuate convex portions 7g, 7g of the rotary cylindrical body 7 to escape.

In the meantime, locking pieces 13b, 13b . . . are provided at about 90° intervals on an outer circumference of a reinforcing member 13, and locking portions 13c, 13c . . . provided on locking pieces 13b, 13b . . . are locked by locking ribs 6k, 6k . . . provided on an inner circumference of a lower interior cylindrical body 6b of a fixed cylindrical body 6.

Still further, a friction mechanism 9 according to this embodiment has a compact and inexpensive structure, so that it has an advantage that it can be manufactured at a low cost. However, the structure of friction mechanism is not limited to the above-described, but various friction mechanisms of known or novel structure are conceivable. Moreover, a plurality of oil reservoir portions 10c, 10c . . . for reserving lubricating oil is radially provided on a first friction washer 10, as well as a plurality of oil reservoir portions 11c, 11c . . . having the same function on a second friction washer 11.

Still further, the structure of elastic means consisting of spring washers or dish springs 15, 16, 17 as in this embodiment realizes compact and inexpensive elastic means. However, the structure is not limited to the one as in this embodiment, but various combinations of spring washers and dish springs are conceivable.

In the following, reference is made to steps for assembling the rotary unit apparatus 1. First, the dish spring 17, the dish spring 16, the dish spring 15, the third friction washer 14, and then the reinforcing member 13 are lightly press-fitted into the male screw portion 8b of the hinge shaft 8, in this order. Before or after this step, the first friction washer 10 is lightly press-fitted into the top of the upper disc portion 6a of the fixed cylindrical body 6, and the spacer washer 12 is mounted on the top of the upper disc portion 6a. Furthermore, the second friction washer 11 is lightly press-fitted into the bottom surface of the lower disc portion 7a of the rotary cylindrical body 7, and then the rotary cylindrical body 7 and the second friction washer 11 as combined are superposed above the fixed cylindrical body 6, and the lower cylindrical body 7f is inserted into the insertion hole 6e of the fixed cylindrical body 6. At this time, the deformed insertion hole 14a of the third friction washer 14 is lightly press-fitted into the engaging portions 7j.

Next, when the male screw portion 8b of the hinge shaft 8 is screwed into the female screw hole 7e of the lower cylindrical body 7f, the first friction washer 10, the second friction washer 11, the third friction washer 14 and the reinforcing member 13 are brought into pressurized contact with each other, by the resilient force of the dish springs 15, 16, 17. At this time, the top of the male screw portion 8b protrudes upwards from the female screw hole 7e on the rotary cylindrical body 7 side. Then the nut portion 8c is screwed with a part of the male screw portion 8b protruding from the female screw hole 7e and fastened, so that the assembly of the rotary unit apparatus 1 is accomplished. Next, the fixed cylindrical body 6 is fixed to the base member 4 by screwing attaching screws (not shown) into corresponding female holes 6j, 6j . . . , and the attaching plate 5a of the bracket 5 is fixed by screwing attaching screws (not shown) into corresponding female holes 7i, 7i . . . , so that the assembly of the rotation supporting apparatus 3 is accomplished. Accordingly, friction torque is generated by screwing the male screw portion 8b of the hinge shaft 8 into the female screw hole 7e of the lower cylindrical body 7f, and it is fastened with the nut portion 8c for preventing it from loosening.

The television 2 is then attached to the supporting member 5b of the bracket 5, the base member 4 is put on a mounting stand (not shown). When the viewer tries to rotate the television 2 in horizontal right and left direction from the above-mentioned state, the rotary cylindrical body 7 rotates with respect to the fixed cylindrical body 6, therefore the television 2 rotates in right and left direction via the rotary unit apparatus 1. In this manner, the display can be turned in any direction desired by the viewer on each occasion. At this time, the rotational operation assures an ideal operation feeling for the operator as well as a stable support at stopping position, by the friction mechanism 9, since the second friction washer 11 and the third friction washer 14 rotating together with the rotary cylindrical body 7 generate friction torque between the first friction washer 10 and the reinforcing member 13, as fixed to the fixed cylindrical body 6. Moreover, the rotational angle is regulated by the arcuate convex portions 7g, 7g of the rotary cylindrical body 7, which move inside the arcuate groove portions 6g, 6g of the fixed cylindrical body 6. In this manner, the arcuate groove portions 6g, 6g and the arcuate convex portions 7g, 7g constitute altogether stopper means.

Furthermore, though the spacer washer 12 does not create the friction torque, is provided in order to prevent the upper disc portion 6a of the fixed cylindrical body 6 and the lower disc portion 7a of the rotary cylindrical body 7 from a contact with each other so as to cause damages, with forces from outside being applied in rotation or at rest.

Still further, even if unreasonable force is applied on the rotary unit apparatus 1 by pushing the top end portions on the right or left hand side of the television 2 in up- and down directions, the locking portions 13c, 13c . . . of the reinforcing member 13 are locked by corresponding locking ribs 6k, 6k . . . , so that the applied force is dispersed to the lower interior cylindrical body 6b of the fixed cylindrical body 6. In this manner, it is possible to prevent the upper disc portion 6a from escaping downward or breaking in the area of the third friction washer 14.

Embodiment 2

FIGS. 10 to 14 show another embodiment, i.e. Embodiment 2. According to the drawings, a rotary unit apparatus 21 according to Embodiment 2 under this section differs from a rotary unit apparatus 1 according to Embodiment 1 merely in structure of reinforcing member(s), and otherwise it is identical to the rotary unit apparatus 1. Therefore, no detailed descriptions are made to the entire apparatus. Moreover, those with identical reference numerals have an identical structure, as well as identical operation and effect.

Reinforcing members according to Embodiment 2 as described below include a first reinforcing member 24 attached to the fixed cylindrical body 23 side, and a second reinforcing member 26 attached to the rotary cylindrical body 25 side. The first reinforcing member 24 is identical to a reinforcing member 13 according to Embodiment 1, in that the former is provided between a lower side of an upper disc portion 23a of the fixed cylindrical body 23 and a third friction washer 14, and comprises an insertion hole 24a in which a male screw portion 8b of a hinge shaft 8 is inserted. However, the first reinforcing member 24 according to Embodiment 2 differs from the reinforcing member 13 according to Embodiment 1, in that three locking pieces 24b, 24b ... of the first reinforcing member 24 extend up to the open end side at a bottom end portion of a lower interior cylindrical body 23b, and that respective locking portions 24c, 24c ... provided on the locking pieces 24b, 24b ... are locked by corresponding locking concave portions 23c, 23c ... provided on the open end side at a bottom end portion of a lower interior cylindrical body 23b.

A second reinforcing member 26 is provided between an upper surface side of a lower disc portion 25a of a rotary cylindrical body 25 and a nut portion 8c of a hinge shaft 8. The second reinforcing member 26 has an insertion hole 26a in which a male screw portion 8b of a hinge shaft 8 is inserted; furthermore, four locking pieces 26b, 26b ... are provided to extend upward from the outer circumference of the second reinforcing member 26. Respective locking portions 26c, 26c ... provided on the locking pieces 26b, 26b ... are locked by corresponding locking concave portions 25c, 25c ... provided on the open end side at an upper end portion of an upper interior cylindrical body 25b of the rotary cylindrical body 25.

Accordingly, even if unreasonable force is applied on the upper disc portion 23a and the lower disc portion 25a, the applied force is dispersed to the lower interior cylindrical body 23b of the fixed cylindrical body 23 and upper interior cylindrical body 25b of the rotary cylindrical body 25, as described under Embodiment 1. In this manner, the rotary unit apparatus 21 can more effectively prevent on the upper disc portion 23a and the lower disc portion 25a from escaping downward or breaking in the area of the male screw portion 8b.

Embodiment 3

Figure 15:
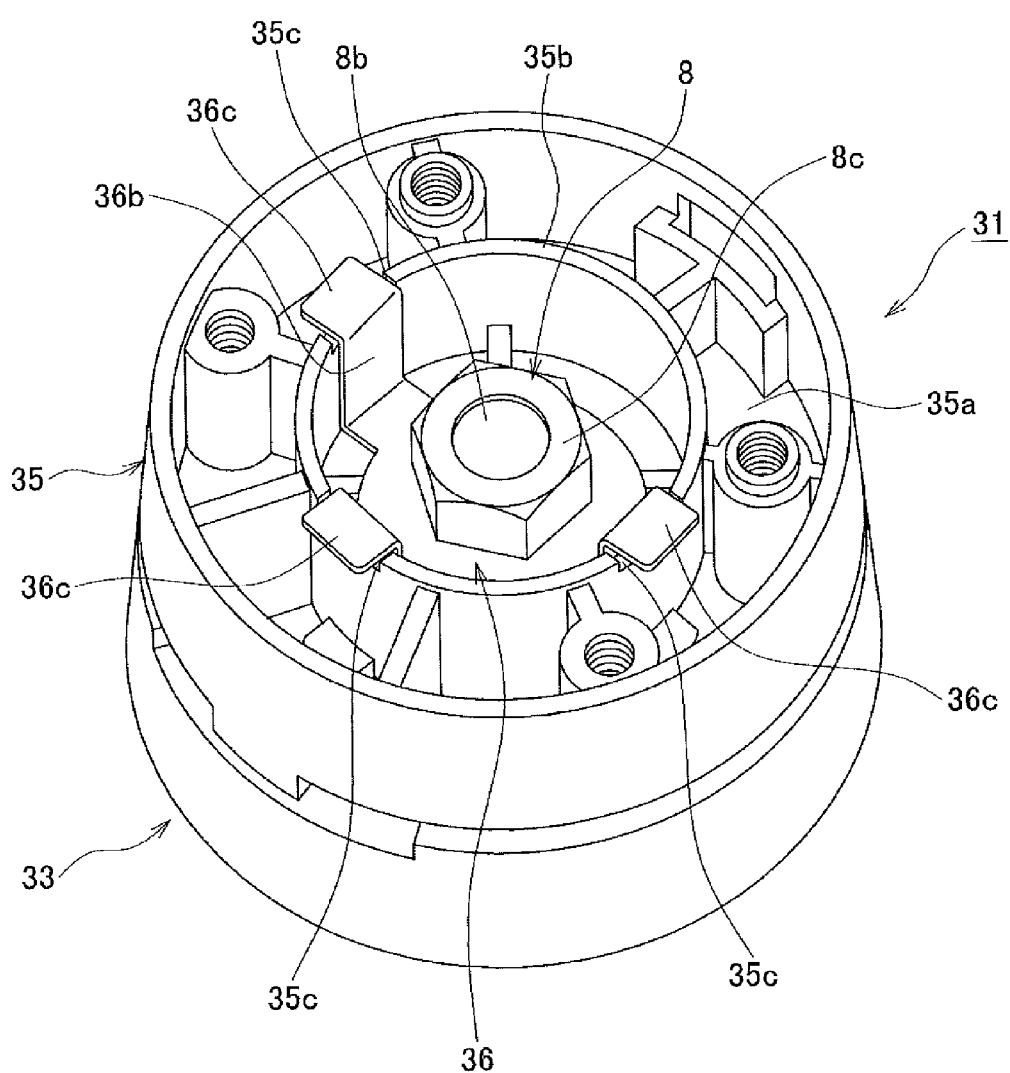
FIG. 15 is a perspective view showing still other embodiment of a rotary unit apparatus according to the present invention.
Figure 16:
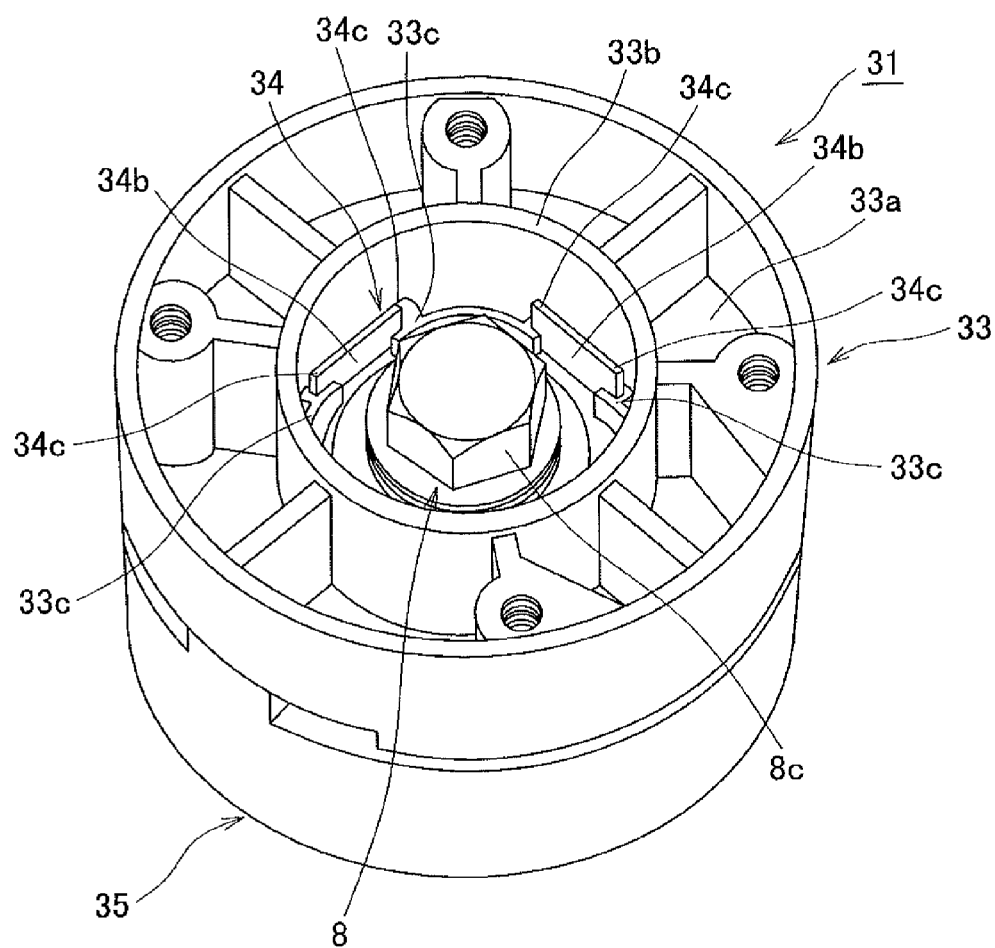
FIG. 16 is a perspective view of a rotary unit apparatus as shown in FIG. 15, wherein the perspective view is seen from below.
Figure 17:
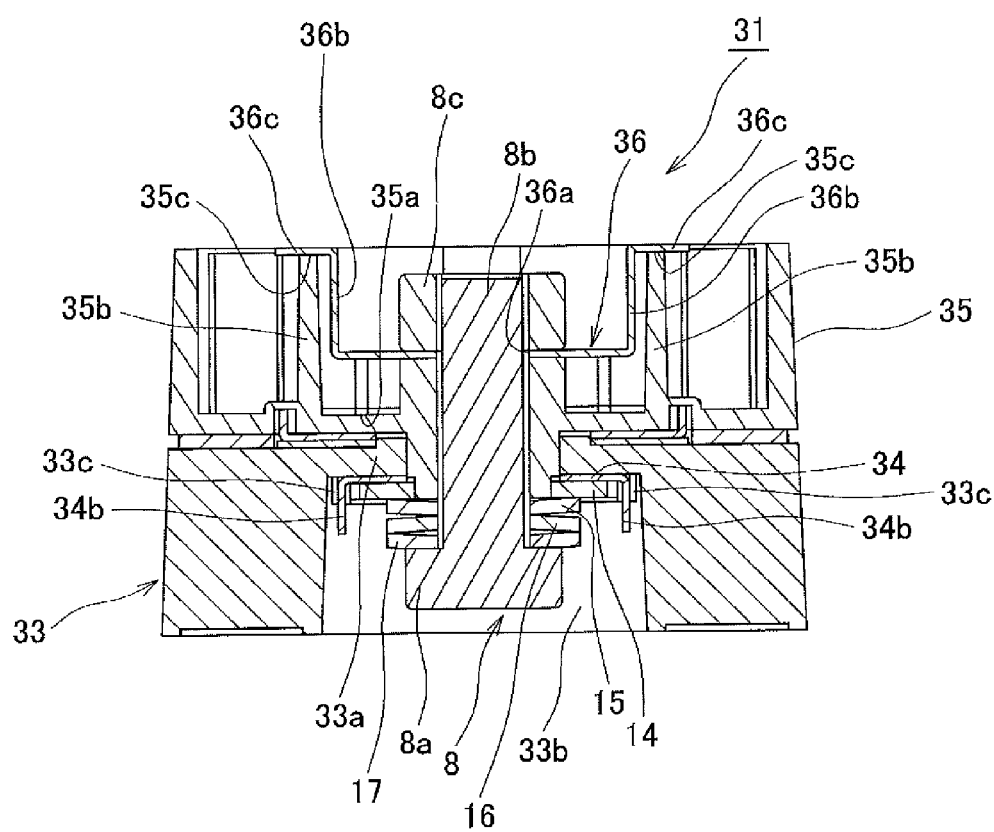
FIG. 17 a longitudinal sectional view of a rotary unit apparatus as shown in FIG. 15.
Figure 18:
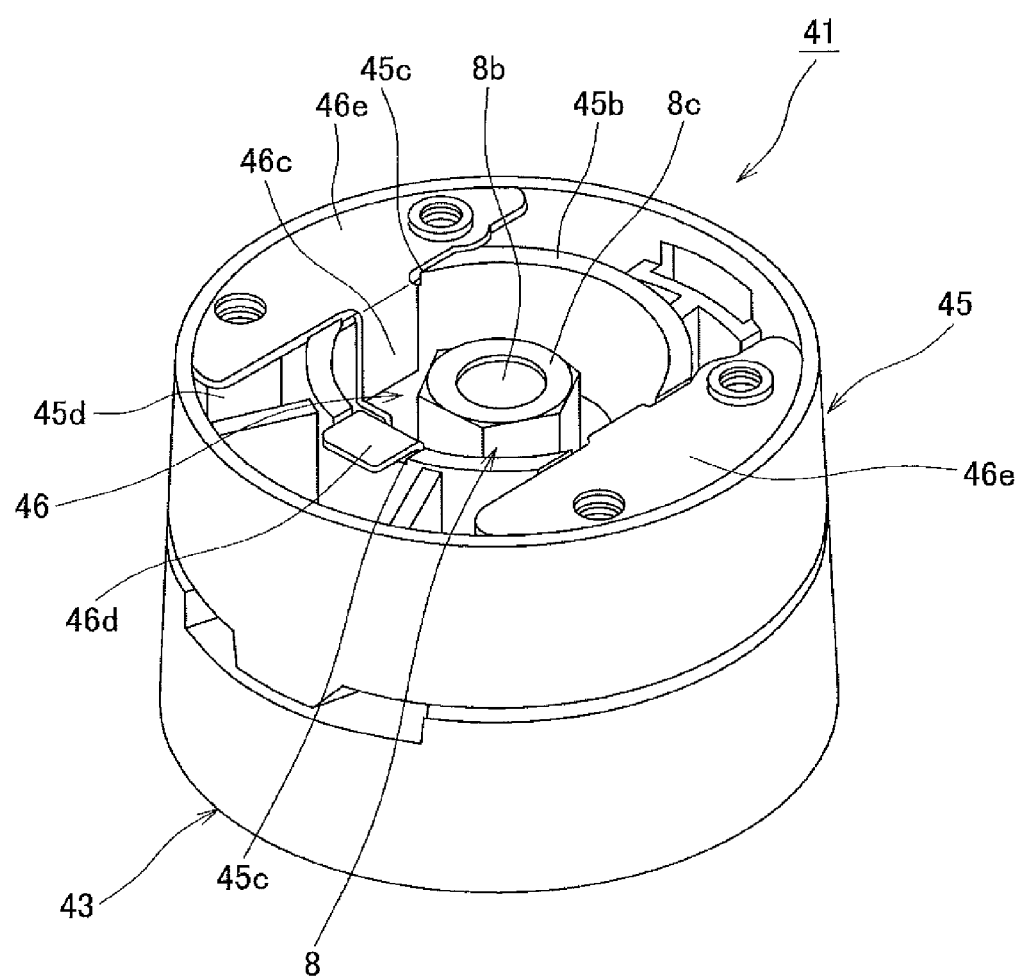
FIG. 18 is a perspective view showing still other embodiment of a rotary unit apparatus according to the present invention.
Figure 19:
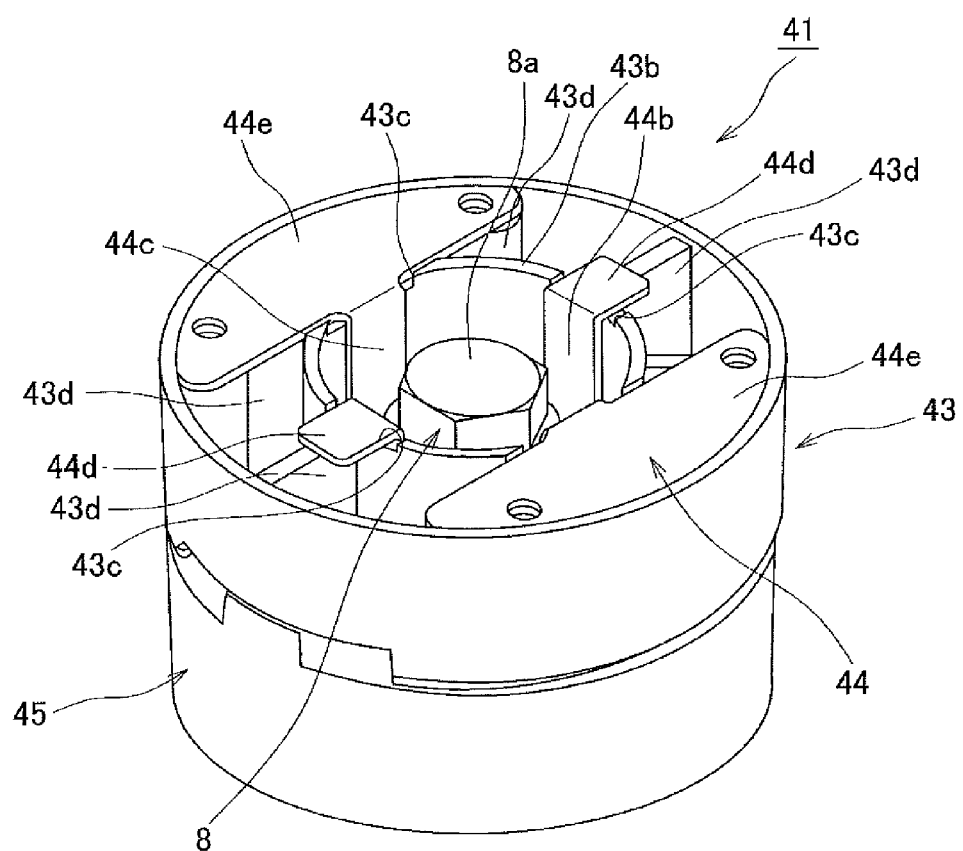
FIG. 19 is a perspective view of a rotary unit apparatus as shown in FIG. 18, the perspective view being seen from below.
Figure 20:
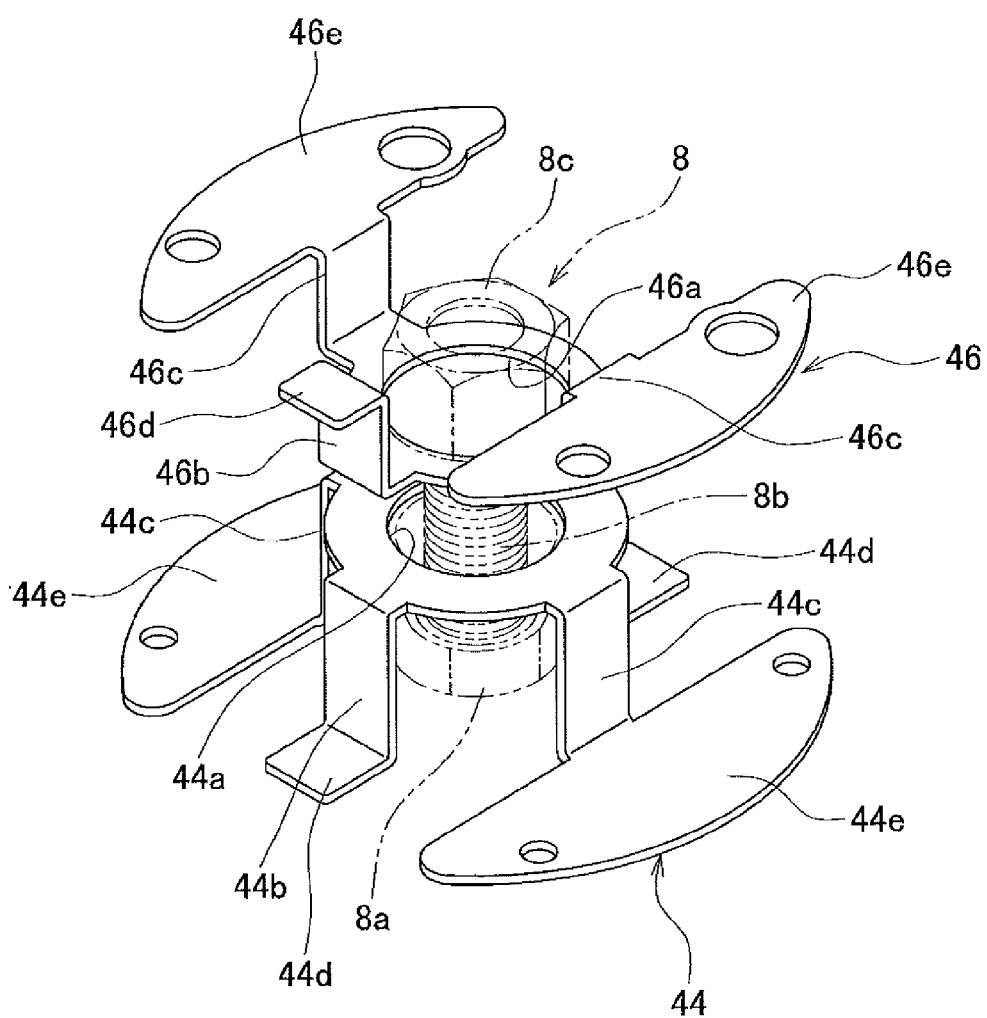
FIG. 20 is a perspective view illustrating the state, in which a fourth reinforcing member and a fifth reinforcing member of a rotary unit apparatus as shown in FIG. 18 are used.
Figure 21:
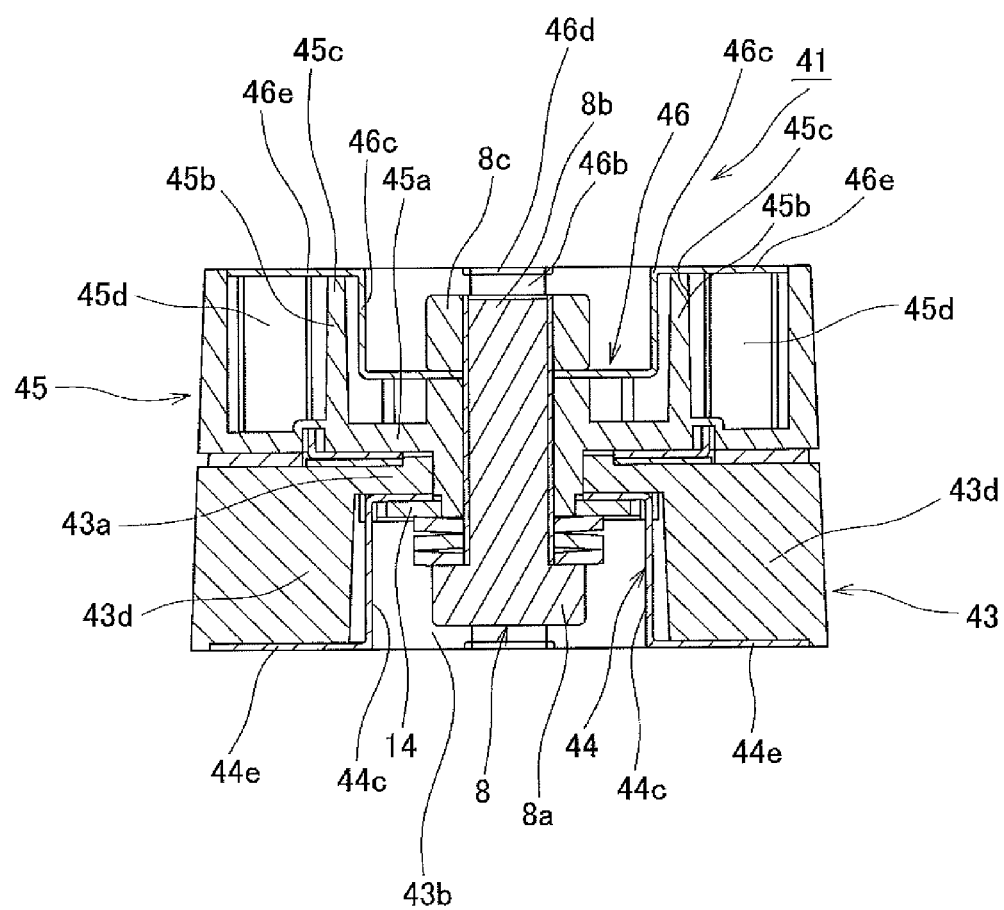
FIG. 21 a longitudinal sectional view of a rotary unit apparatus as shown in FIG. 18.

FIGS. 15 to 17 show another embodiment, i.e. Embodiment 3. According to the drawings, a rotary unit apparatus 31 according to Embodiment 3 under this section differs from a rotary unit apparatus 1 according to Embodiment 1 merely in a reinforcing member additionally attached to a rotary cylindrical body, and otherwise it is identical to the rotary unit apparatus 1. Therefore, no detailed descriptions are made to the entire apparatus. Moreover, those with identical reference numerals have an identical structure, as well as identical operation and effect.

Reinforcing members of a rotary unit apparatus 31 according to Embodiment 3 include a first reinforcing member 34 attached to the fixed cylindrical body 33 side, and a second reinforcing member 36 attached to the rotary cylindrical body 35 side. The first reinforcing member 34 is identical to a reinforcing member 13 according to Embodiment 1. However, the first reinforcing member 34 is provided between a third friction washer 14 and an upper disc portion 33a of the fixed cylindrical body 33. The first reinforcing member 34 comprises an insertion hole 34a in an axial direction on a central portion, wherein a male screw portion 8b of a hinge shaft 8 is inserted into the insertion hole; furthermore, four locking pieces 34b, 34b ... are provided at 90° intervals, and respective locking portions 34c, 34c ... provided on the locking pieces 34b, 34b ... are locked by corresponding locking concave portions 33c, 33c ... provided on the open end side at a bottom end portion of a lower interior cylindrical body 33b of the fixed cylindrical body 33.

A second reinforcing member 36 is provided between an upper surface side of a lower disc portion 35a of a rotary cylindrical body 35 and a nut portion 8c of a hinge shaft 8. The second reinforcing member 36 has an insertion hole 36a in which a male screw portion 8b of a hinge shaft 8 is inserted; furthermore, three locking pieces 36b, 36b ... are provided to extend upward from the outer circumference of the second reinforcing member 36. Respective locking portions 36c, 36c ... provided on the locking pieces 36b, 36b ... are locked by corresponding locking concave portions 35c, 35c ... provided on the open end side at an upper end portion of an upper interior cylindrical body 35b of the rotary cylindrical body 35.

Accordingly, even if unreasonable force is applied on the upper disc portion 33a of the fixed cylindrical body 33 and the lower disc portion 35a of the rotary cylindrical body 35, the applied force is dispersed to the lower interior cylindrical body 33b of the fixed cylindrical body 33 and the upper interior cylindrical body 35b of the rotary cylindrical body 35, as described under Embodiment 1. In this manner, the rotary unit apparatus 31 according to Embodiment 3 can more effectively prevent the upper disc portion 33a and the lower disc portion 35a from escaping downward or breaking in the area of the male screw portion 8b.

Embodiment 4

FIGS. 18 to 21 show another embodiment, i.e. Embodiment 4. According to the drawings, a rotary unit apparatus 41 according to Embodiment 4 under this section differs from a rotary unit apparatus 1 according to Embodiment 1 merely in structure of reinforcing member(s), and otherwise it is identical to the rotary unit apparatus 1. Therefore, no detailed descriptions are made to the entire apparatus. Moreover, those with identical reference numerals have an identical structure, as well as identical operation and effect.

Reinforcing members of a rotary unit apparatus 41 according to Embodiment 4 include a first reinforcing member 44 attached to the fixed cylindrical body 43 side, and a second reinforcing member 46 attached to the rotary cylindrical body 45 side. The first reinforcing member 44 is identical to a reinforcing member 13 according to Embodiment 1, in that the former is provided between a lower side of an upper disc portion 43a of the fixed cylindrical body 43 and a third friction washer 14, and comprises an insertion hole 44a in which a male screw portion 8b of a hinge shaft 8 is inserted. However, the first reinforcing member 44 according to Embodiment 4 differs from the reinforcing member 13 according to Embodiment 1, in that two locking pieces 44b, 44b and two locking pieces 44c, 44c of the first reinforcing member 44, wherein the former have a different shape from the latter, extend up to the open end side at a bottom end portion of a lower interior cylindrical body 43b, and that respective locking portions 44d, 44d provided on the locking pieces 44b, 44b are locked by corresponding locking concave portions 43c, 43c provided on the open end side at a bottom end portion of a lower interior cylindrical body 43b, while respective locking portions 44e, 44e provided on the locking pieces 44c, 44c are locked by the open end side at a lower end portion of the lower interior cylindrical body 43b, as well as outer ribs 43d, 43d.

A second reinforcing member 46 is provided between an upper surface side of a lower disc portion 45a inside a lower interior cylindrical body 43b of a rotary cylindrical body 45 and a nut portion 8c of a hinge shaft 8. The second reinforcing member 46 is identical to a reinforcing member 26 according to Embodiment 2, in that the former has an insertion hole 46a in which a male screw portion 8b of a hinge shaft 8 is inserted. However, the second reinforcing member 46 according to Embodiment 4 differs from the reinforcing member 26 according to Embodiment 2, in that one locking piece 46b and two locking pieces 46c, 46c, wherein the former has a different shape from the latter, extend up to the open end side at an upper end portion of an upper interior cylindrical body 45*b*, and that a locking portion 46*d* provided on the locking piece 46*b* is locked by a locking concave portion 45*c* provided on the open end side at a bottom end portion of an upper interior cylindrical body 45*b*, while respective locking portions 46*e*, 46*e* provided on the remaining locking pieces 46*c*, 46*c* are locked by the open end side at a lower end portion of the upper interior cylindrical body 45*b*, as well as outer ribs 45*d*, 45*d*.

Accordingly, even if unreasonable force is applied on the upper disc portion 43*a* of the fixed cylindrical body 43 and the lower disc portion 45*a* of the rotary cylindrical body 45, the applied force is dispersed to the lower interior cylindrical body 43*b* of the fixed cylindrical body 43 and the outer ribs 43*d*, 43*d*, as well as the upper interior cylindrical body 45*b* of the rotary cylindrical body 45 and the outer ribs 45*d*, 45*d*, as described under Embodiment 1. In this manner, the rotary unit apparatus 41 according to Embodiment 4 can more effectively prevent on the upper disc portion 43*a* and the lower disc portion 45*a* from escaping downward or breaking in the area of the male screw portion 8*b*.

In the meantime, reinforcing member(s) can be provided between elastic means consisting of spring washers or dish springs, in each of the above-described embodiments. Furthermore, a reinforcing member provided on the rotary cylindrical body side allows for an optional interposition of washer between the reinforcing member itself and a nut portion.

Still further, various combinations of reinforcing members, i.e. the one provided on the fixed cylindrical body side and the one provided on the rotary cylindrical body side, are not limited to the combinations described in the above-described embodiments. Other appropriate combinations are also possible.

The present invention is structured as in the foregoing, so that it is suitable for use in a rotary unit apparatus which is applicable to a rotation supporting apparatus for a flat-type television receiver, a flat-type display device or audio equipment, and so on.

What is claimed is:

1. A rotary unit apparatus comprising a fixed cylindrical body attached to a base member, said fixed cylindrical body comprising: an upper disc portion; a lower interior cylindrical body surrounding an insertion hole provided on said upper disc portion, said lower interior cylindrical body being provided to hang down perpendicular to said upper disc portion; a lower exterior cylindrical body provided on an outer circumference of said lower interior cylindrical body spaced apart at a predetermined interval from said lower exterior cylindrical body, said lower interior cylindrical body being provided to hang down perpendicular to said upper disc portion; and a plurality of outer ribs connecting said lower interior cylindrical body and said lower exterior cylindrical body;

a rotary cylindrical body attached to a supporting member, said rotary cylindrical body comprising: a lower disc portion; an upper interior cylindrical body erected upward from said lower disc portion; an upper exterior cylindrical body provided on an outer circumference of said upper interior cylindrical body spaced apart at a predetermined interval from said upper interior cylindrical body and erected upward from said lower disc portion; a plurality of outer ribs connecting said upper interior cylindrical body and said upper interior cylindrical body; and a lower cylindrical body provided so as to hang down perpendicular to said lower disc portion and to pass through said insertion hole provided on said upper disc portion, said lower cylindrical body protruding to the inside of said lower interior cylindrical body;

a hinge shaft passing through said lower cylindrical body, said hinge shaft connecting said rotary cylindrical body and said fixed cylindrical body in a relatively rotatable manner;

a friction mechanism comprising a first friction washer, said hinge shaft being inserted into an insertion hole of said first friction washer and said first friction washer being locked by said upper disc portion of said fixed cylindrical body; a second friction washer in contact with said first friction washer, said hinge shaft being inserted into an insertion hole of said second friction washer and said second friction washer being locked by said upper disc portion of said fixed cylindrical body; a third friction washer in direct or indirect contact with a lower surface side of said upper disc portion, said third friction washer being fixed to said lower cylindrical body; and elastic means in contact with said third friction washer, said elastic means being mounted on said hinge shaft; and a reinforcing member being provided in a direct and/or indirect contact with said upper disc portion inside said lower interior cylindrical body of said fixed cylindrical body and/or said lower disc portion inside said lower interior cylindrical body of said rotary cylindrical body, and locking pieces provided on said reinforcing member being locked by said lower interior cylindrical body and/or said upper interior cylindrical body.

2. The rotary unit apparatus according to claim 1, wherein said hinge shaft comprises a male screw portion and a nut portion, and said male screw portion is screwed into a female screw hole provided on said lower cylindrical body of said rotary cylindrical body.

3. The rotary unit apparatus according to claim 1, wherein a spacer washer is provided between said upper disc portion of said fixed cylindrical body and said lower disc portion of said rotary cylindrical body, said spacer washer comprising an insertion hole and being fixed to said upper disc portion, by housing said first friction washer and said second friction washer into said insertion hole of said spacer washer.

4. The rotary unit apparatus according to claim 1, wherein said reinforcing member comprises a plurality of locking pieces provided by folding edges of said reinforcing member, and locking portions of said locking pieces are locked by locking ribs provided on an inner wall of said lower interior cylindrical body and/or said upper interior cylindrical body, so as to structure said reinforcing member.

5. The rotary unit apparatus according to claim 1, wherein said reinforcing member comprises a plurality of locking pieces provided by folding edges of said reinforcing member, and locking portions of said locking pieces are locked by an open end side of said lower interior cylindrical body and/or said upper interior cylindrical body, so as to structure said reinforcing member.

6. The rotary unit apparatus according to claim 1, wherein said reinforcing member comprises a plurality of locking pieces provided by folding edges of said reinforcing member, and locking portions of said locking pieces are locked by an open end side of said lower interior cylindrical body and/or said upper interior cylindrical body, and/or said outer ribs, so as to structure said reinforcing member.

7. The rotary unit apparatus according to claim 1, wherein said reinforcing member comprises a plurality of locking pieces provided by folding edges of said reinforcing member, and locking portions of said locking pieces are locked by locking ribs provided on an inner wall of said lower interior cylindrical body and/or said upper interior cylindrical body, and/or said open end side of said lower interior cylindrical body and/or said upper interior cylindrical body, so as to structure said reinforcing member.

8. A rotation supporting apparatus, comprising the rotary unit apparatus according claim 1.

9. A rotation supporting apparatus, comprising the rotary unit apparatus according claim 2.

10. A rotation supporting apparatus, comprising the rotary unit apparatus according claim 3.

11. A rotation supporting apparatus, comprising the rotary unit apparatus according claim 4.

12. A rotation supporting apparatus, comprising the rotary unit apparatus according claim 5.

13. A rotation supporting apparatus, comprising the rotary unit apparatus according claim 6.

14. A rotation supporting apparatus, comprising the rotary unit apparatus according claim 7.

* * * * *